(12) United States Patent
Wang

(10) Patent No.: US 7,673,276 B2
(45) Date of Patent: Mar. 2, 2010

(54) METHOD AND SYSTEM FOR CONDUCTING A LOW-POWER DESIGN EXPLORATION

(75) Inventor: Qi Wang, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 57 days.

(21) Appl. No.: 11/588,927

(22) Filed: Oct. 26, 2006

(65) Prior Publication Data

US 2008/0126999 A1 May 29, 2008

(51) Int. Cl.
*G06F 17/50* (2006.01)
(52) U.S. Cl. .......................................... 716/18
(58) Field of Classification Search ..................... 716/3, 716/18
See application file for complete search history.

(56) References Cited

U.S. PATENT DOCUMENTS

| | | | |
|---|---|---|---|
| 6,600,358 B1 * | 7/2003 | Chan .......................... | 327/333 |
| 6,779,163 B2 | 8/2004 | Bednar et al. | |
| 6,820,240 B2 | 11/2004 | Bednar et al. | |
| 6,883,152 B2 | 4/2005 | Bednar et al. | |
| 2006/0190848 A1 * | 8/2006 | Oosuka et al. ................. | 716/2 |

OTHER PUBLICATIONS

L. Zhong et al., Interconnect-aware High-level Synthesis for Low Power, IEEE/ACM International Conference on Computer Aided Design, Nov. 2002, pp. 110-117.*
Kanno et al., Hierarchical Power Distribution with 20 Power Domains in 90-nm Low-Power Multi-CPU Processor, 2006 IEEE International Conference on Solid-State Circuits Digest of Technical Papers, Feb. 2006, pp. 2200-2209.*
Viswanath et al., "Automatic Insertion of Low Power Annotations in RTL for Pipelined Microprocessors", Proceedings of Design, Automation, and Test in Europe 2006, vol. 1, pp. 1-6, Mar. 2006.*
Usami et al., "Low-power Design Methodology and Applications Utilizing Dual Supply Voltages", Proceedings of the Asia and South Pacific Design Automation Conference, 2000, pp. 123-128.*

* cited by examiner

*Primary Examiner*—Vuthe Siek
*Assistant Examiner*—Aric Lin
(74) *Attorney, Agent, or Firm*—Duane Morris LLP

(57) ABSTRACT

Method and system for conducting low-power design explorations are disclosed. The method includes receiving an RTL netlist of a circuit design, creating one or more power requirement files, wherein each power requirement file comprises power commands corresponding to the RTL netlist, generating one or more low-power RTL netlists using the corresponding one or more power requirement files and the RTL netlist, and conducting low-power design explorations using the one or more low-power RTL netlists.

22 Claims, 4 Drawing Sheets

METHOD AND SYSTEM FOR CONDUCTING A LOW-POWER DESIGN EXPLORATION

FIELD OF THE INVENTION

The present invention relates to the field of electronic design automation tools. In particular, the present invention relates to a method and system for conducting low-power design explorations.

BACKGROUND OF THE INVENTION

In recent years, mobile consumer electronic devices, such as cellular phones, digital cameras, and personal digital assistant (PDA) devices, have had significant success in the marketplace. The compact design of such mobile consumer electronic devices requires more and more functionalities to be packed into one integrated circuit chip, also referred to as system-on-chip (SoC). As consumers continue to demand longer battery life and higher performance from their mobile devices, low-power design in integrated circuits has become one of the most critical design issues, requiring designers to conduct low-power design explorations early in the design process.

In a conventional integrated circuit design methodology, low-power design explorations are performed at the physical design stage of the design process. Designers first synthesize a register-transfer-level (RTL) netlist description of a design into a gate-level netlist description of the design. Then, low-power logic elements are inserted, often manually, into the gate-level netlist. Designers then conduct low-power design explorations with the gate-level netlist. One drawback of this approach is that designers are unable to make high-level architectural power design explorations in the early design stages because the low-power design explorations happen in the late stages of the design process. Another drawback of this approach is that if the gate-level netlist containing the low-power logic elements does not meet the power design goals, then designers have to repeat the RTL design, synthesis, and low-power logic insertion processes from the beginning. This approach is time-consuming and prone to human errors in the manual insertion of low-power logic elements into the gate netlist of the design.

In another conventional integrated circuit design methodology, designers modify the RTL netlist to insert, often manually, low-power logic elements. This modified RTL netlist is then used for low-power design explorations. One drawback of this approach is that it does not allow the designers to explore the possible power domains and power modes with the RTL netlist as there is no mechanism to define such power domains and power modes. Another drawback of this approach is that if the modified RTL netlist containing low-power logic elements does not meet the power design goals, then designers have to remove the entire or portions of the previous design modifications and insert new design modifications in the RTL netlist. This approach is also time-consuming and prone to human errors in the manual insertion of low-power logic elements into the RTL netlist of the design.

Therefore, there is a need to address the drawbacks of the conventional low-power design methodologies, and there is a need for a method and system for conducting low-power design explorations.

SUMMARY

The present invention relates to a method and system for conducting low-power design explorations. In one embodiment, the method includes receiving an RTL netlist of a circuit design, creating one or more power requirement files, wherein each power requirement file comprises power commands corresponding to the RTL netlist, generating one or more low-power RTL netlists using the corresponding one or more power requirement files and the RTL netlist, and conducting low-power design explorations using the one or more low-power RTL netlists.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the figures.

DESCRIPTIONS OF EMBODIMENTS

Methods and systems are provided for conducting low-power design explorations. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed descriptions that follow are presented in terms of flowcharts, logic blocks, and other symbolic representations of operations on information that can be performed on a computer system. A procedure, computer-executed instruction, logic block, process, etc., is here conceived to be a self-consistent sequence of one or more instructions leading to a desired result. The instructions are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each instruction may be performed by hardware, software, firmware, or combinations thereof.

In the following descriptions, a power requirement file (also referred to as a CPF file) defines a set of low-power commands that may be mapped to corresponding equivalent RTL compiler commands. The set of low-power commands may include library cell commands, such as define_isolation_cell, define_level_shifter_cell, and define_state_retention_cell commands. In addition, the set of low-power commands may include design implementation commands, such as create_isolation_rule, create_level_shifter_rule, create_state_retention_rule, create_power_domain, and identify_power_rule commands. Furthermore, the set of low-power commands may include design scope commands, such as set_design, end_design, set_instance, and set_hierarchy separator commands. In some embodiments, the functions of an RTL compiler may be performed by a general synthesis tool.

Figure 1:
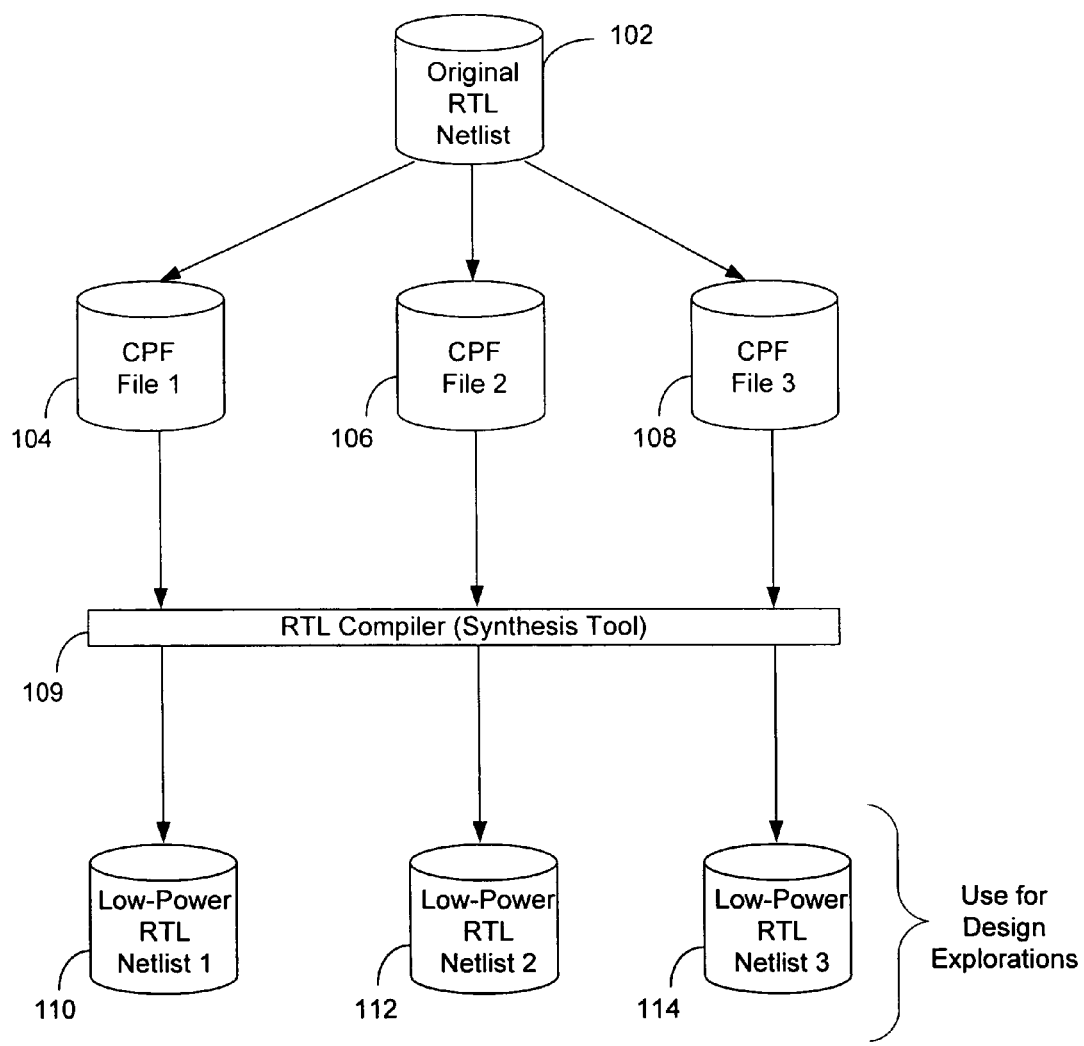
FIG. 1 illustrates a method for conducting low-power design explorations according to an embodiment of the present invention.

FIG. 1 illustrates a method for conducting low-power design explorations according to an embodiment of the present invention. As shown in FIG. 1, an RTL netlist 102 is used for design explorations. This RTL netlist is typically a legacy RTL design that does not include any low-power elements in its RTL description. In this example, three power requirement files, namely CPF file 1 (104), CPF file 2 (106), and CPF file 3 (108), are created for design explorations. Specifically, the RTL netlist and the CPF file 1 can be compiled by an RTL Compiler (synthesis tool) 109 to generate a low-power RTL netlist 1 (110). Similarly, the RTL netlist and the CPF file 2 are compiled to generate a low-power RTL netlist 2 (112); and the RTL netlist and the CPF file 3 are compiled to generate a low-power RTL netlist 3 (114). The low-power RTL netlists, 110, 112, and 114, are used for conducting design explorations of the circuit. Moreover, the low-power RTL netlists 110, 112, and 114 may be synthesized to generate corresponding low-power gate netlists for further design explorations.

The present invention separates the functional design of an integrated circuit as represented by the original RTL netlist 102 from the power design of the integrated circuit as represented by the power specification file. This approach enables designers to use legacy RTL netlists that were designed without any power considerations. It combines the power requirements of the design as specified in the CPF file with the legacy RTL netlist to create a new low-power RTL netlist. This approach is applicable even when the original RTL netlist was created with power design taken into account. For example, the original RTL netlist may be designed for the power requirements of a desktop computer. When designers want to use the same RTL netlist in a mobile device, they can specify the new power requirements in the CPF file and run the RTL compiler (synthesis tool) to create a new low-power RTL netlist using the original RTL netlist and the CPF file. In the example described above, the original RTL netlist remains the same, and thus the functionality of the original design is preserved.

In one embodiment, the method and system for conducting low-power design explorations may be implemented using a computer system. The computer system may include one or more central processing units (CPUs), at least a user interface for displaying computation results and waveforms, a memory device, a system bus, and one or more bus interfaces for connecting the CPU, user interface, memory device, and system bus together. The computer system also includes at least one network interface for communicating with other devices on a computer network. In alternative embodiments, much of the functionality of the method and system for conducting low-power design explorations may be implemented in one or more application-specific integrated circuits (ASICs) or field-programmable gate arrays (FPGAs), thereby either eliminating the need for a CPU, or reducing the role of the CPU.

The memory device may include high-speed random-access memory and may also include non-volatile memory, such as one or more magnetic disk storage devices. The memory device may also include mass storage that is remotely located from the CPU(s). The memory device preferably stores:

an operating system that includes procedures for handling various basic system services and for performing hardware-dependent tasks;
databases for storing information of the circuit;
application programs for performing other user-defined applications and tasks; and
a program for conducting low-power design explorations.

The databases, the application programs, and the program for conducting low-power design explorations may include executable procedures, sub-modules, tables, and other data structures. In other embodiments, additional or different modules and data structures may be used, and some of the modules and/or data structures listed above may not be used.

The following is an exemplary netlist of the CPF file 1 (104) of the top design according to an embodiment of the present invention.

```
# Define top design
set_design top
# Set up logic structure for all power domains
create_power_domain -name PD1 -default
create_power_domain -name PD2 -instances {inst_A
inst_B} \
-shutoff_condition {pm_inst.pse_enable[0]}
create_power_domain -name PD3 -instances
inst_C \
-shutoff_condition {pm_inst.pse_enable[1]}
create_power_domain -name PD4 -instances
inst_D \
-shutoff_condition {pm_inst.pse_enable[2]}
# Define static behavior of all power #domains and
specify timing constraints
create_nominal_condition -name nom -voltage 1.2
create_power_mode -name PM1 -
domain_conditions { PD1@nom PD2@nom PD3@nom
PD4@nom} -sdc_files ../SCRIPTS/cm1.sdc \
-activity_file ../SIM/top_1.tcf
create_power_mode -name PM2 -
domain_conditions {PD1@nom PD3@nom PD4@nom}
-sdc_files ../SCRIPTS/cm2.sdc
create_power_mode -name PM3 -
domain_conditions {PD1@nom PD2@nom}
create_power_mode -name PM4 -
domain_conditions {PD1@nom}
# Set up required isolation and state
retention logic of all domains
create_state_retention_rule -restore_edge
{pm_inst.pge_enable[0]} \
-instances inst_A.reg_bank_1.out
create_state_retention_rule -power_domain PD3 -
restore_edge \
{pm_inst.pge_enable[1]}
create_state_retention_rule -power_domain PD4 -
restore_edge \
{pm_inst.pge_enable[2]}
create_isolation_rule -from PD2 -
isolation_condition \
{pm_inst.ice_enable[0]} -isolation_output high
create_isolation_rule -from PD3 -
isolation_condition \
{pm_inst.ice_enable[1]}
create_isolation_rule -from PD4 -
isolation_condition \
{pm_inst.ice_enable[2]}
```

In a low-power design, a power domain (PD) is a collection of logic blocks (hierarchical instances) and leaf instances that use the same power supply during normal operation and that can be powered on or off at the same time. In addition, isolation (ISO) cells are logic used to isolate signals which are going from a power-down domain to a power-on domain;

level-shifter (LS) cells are logic to pass data signals between power domains operating at different voltages; and state retention (SR) cells are special flop or latch used to retain the state of the cell when its main power supply is shut off.

Figure 2:
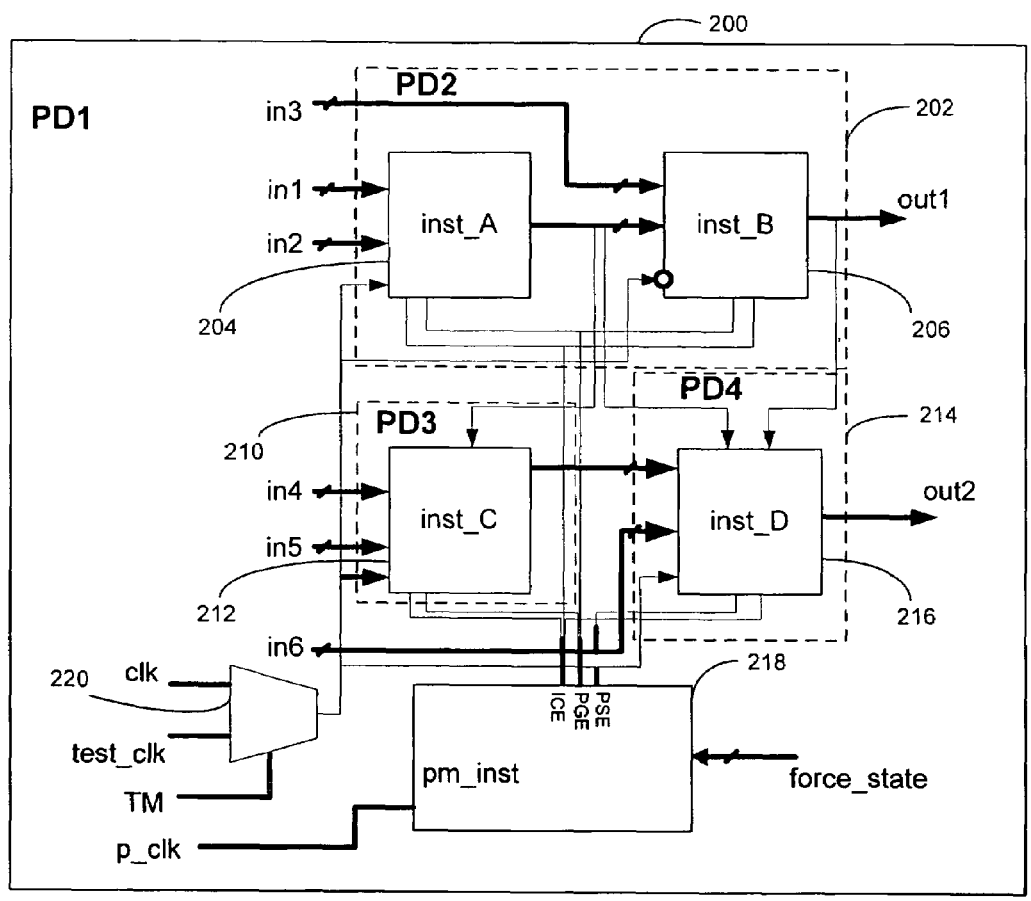
FIG. 2 illustrates a circuit block diagram of the low-power RTL netlist 1 for design exploration according to an embodiment of the present invention.

FIG. 2 illustrates a circuit block diagram of the low-power RTL netlist 1 for design exploration according to an embodiment of the present invention. The example design 200 includes four logic instances inst_A 204, inst_B 206, inst_C 212, and inst_D 216, a power manager instance pm_inst 218, and a clock gating logic 220. Each design instance includes a set of input and output signals. The clock gating logic 220 receives inputs clk and test_clk, and a control signal TM. The output of the clock gating logic controls the gating of the clocks to instances inst_A 204, inst_B 206, inst_C 212, and inst_D 216, respectively.

As shown in FIG. 2, the example design includes four power domains. The top-level design (also referred to as top design) and the power manager instance pm_inst 218 belong to the default power domain PD1 200. Instances inst_A 204 and inst_B 206 belong to the power domain PD2 202. Instance inst_C 212 belongs to power domain PD3 210. Instance inst_D 216 belongs to power domain PD4 214. Note that the present invention enables designers in creating new RTL netlists from the original RTL netlist 102 to include various power domains. Designers may then conduct low-power design explorations with the various power domains created. For example, designers may 1) try different voltages for a power domain, 2) shut off power supply to a power domain, 3) simulate isolation of a power domain, 4) simulate state retention of a power domain, and 5) simulate level shifting between power domains. Table 1 shows the static behavior of the four domains according to embodiments of the present invention.

TABLE 1

| Power Domain | Power Mode | | | |
|---|---|---|---|---|
| | PM1 | PM2 | PM3 | PM4 |
| PD1 | ON | ON | ON | ON |
| PD2 | ON | OFF | OFF | OFF |
| PD3 | ON | ON | OFF | OFF |
| PD4 | ON | ON | ON | OFF |

The power manager instance (pm_inst) 218 generates three sets of control signals, namely pse_enable, ice_enable, and pge_enable, to control each power domain. Table 2 shows control signals of the power manager instance pm_inst 218 for controlling the four power domains according to embodiments of the present invention.

TABLE 2

| | Power Control Signals | | |
|---|---|---|---|
| Power Domain | power switch enable (PSE) | isolation cell enable (ICE) | power gating enable (PGE) |
| PD1 | no control signal | no control signal | no control signal |
| PD2 | pse_enable[0] | ice_enable[0] | pge_enable[0] |
| PD3 | pse_enable[1] | ice_enable[1] | pge_enable[1] |
| PD4 | pse_enable[2] | ice_enable[2] | pge_enable[2] |

The following is an exemplary netlist of the CPF file 2 (106) of the top design according to an embodiment of the present invention.

```
set_design top
create_power_domain -name PD1 -default
create_power_domain -name PD2 -instances {inst_A
    inst_B} -shutoff_condition
    {!pm_inst.pse_enable[0]}
create_power_domain -name PD3 -instances inst_D
create_nominal_condition -name high -voltage 1.2
create_nominal_condition -name low -voltage 1.0
create_power_mode -name PM1 -domain_conditions
    {PD1@low PD2@high PD3@high}
create_power_mode -name PM2 -domain_conditions
    {PD1@low PD3@high}
create_isolation_rule -name ir1 -from PD2 -
    isolation_condition {pm_inst.ice_enable[0]} -
    isolation_output high
create_level_shifter_rule -name lr1 -to PD3
end_design
```

Figure 3:
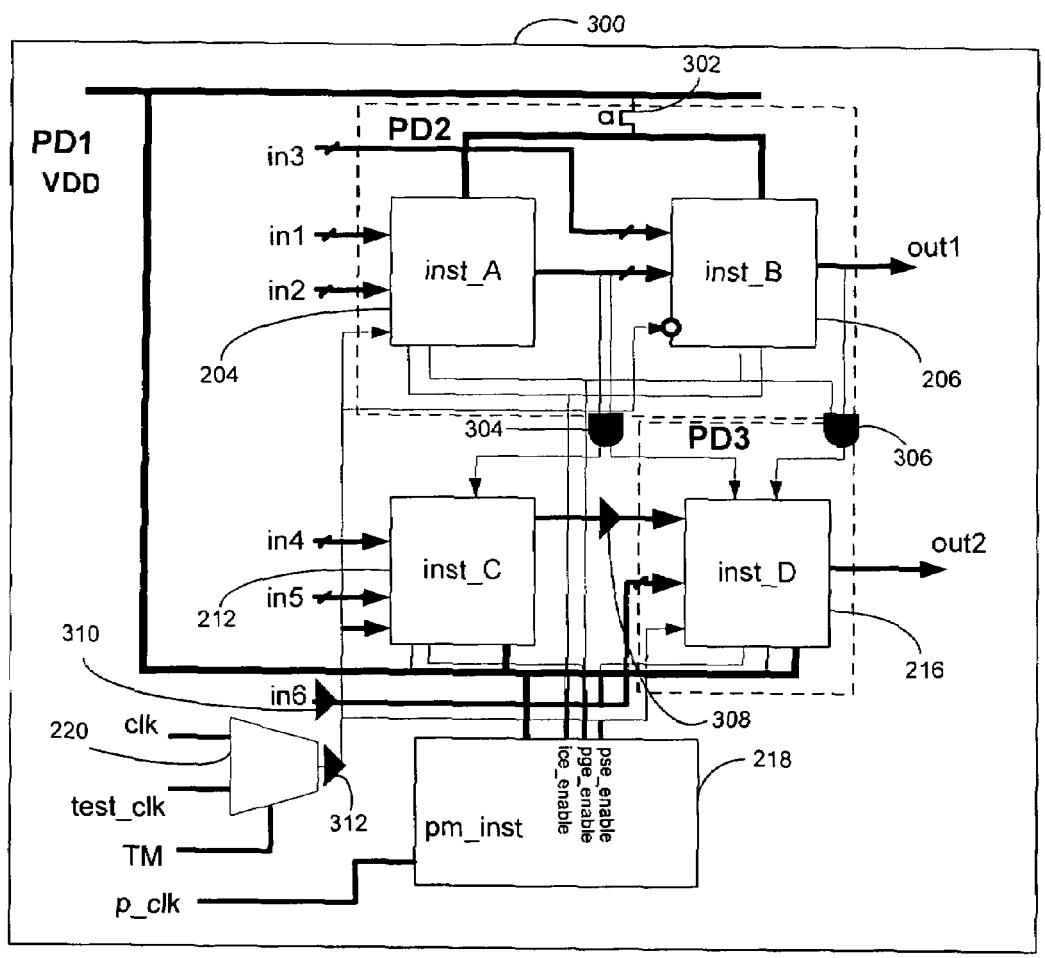
FIG. 3 illustrates a circuit block diagram of the low-power RTL netlist 2 for design exploration according to an embodiment of the present invention.

FIG. 3 illustrates a circuit block diagram of the low-power RTL netlist 2 for design exploration according to an embodiment of the present invention. FIG. 3 represents the low-power RTL netlist 2 that demonstrates variations of low-power design of the RTL netlist 102. The low-power RTL netlist 2 enables designers to explore different combinations of power domains with the same group of circuit instances. For example, the inst_C is part of power domain 1 (PD1) in the RTL netlist 2 as shown in FIG. 3 as opposed to being part of power domain 3 (PD3) in the RTL netlist 1 as shown in FIG. 2. The present invention also enables experimentation with different combinations of power modes so that designers may 1) independently turn on/off a power domain, 2) minimize current flow to a power domain, and 3) minimize leakage current when a power domain is in idle mode.

Among the changes in the circuit block diagram for low-power design exploration, the low-power RTL netlist 2 includes a power switch 302 that connects between the power supplies of power domain 1 (PD1) and power domain 2 (PD2). The low-power RTL netlist 2 also includes two isolation cells 304 and 306. Specifically, the isolation cell 304 isolates output signals of inst_A from power domain 2 (PD2) to a first input signal of inst_C of power domain 1 (PD1) and to a second input signal of inst_D of power domain 3 (PD3). The isolation cell 306 isolates a first output signal from inst_A and a second output signal from inst_B of power domain 2 (PD2) to an input signal of inst_D of power domain 3 (PD3).

Furthermore, the low-power RTL netlist 2 includes level-shifter cells 308, 310, and 312. The level-shifter 308 adjusts the voltage levels of an output signal from inst_C of power domain 1 (PD1) to an input signal of inst_D of power domain 3 (PD3). The level-shifter 310 adjusts the voltage levels of an input signal (in6) of power domain 1 (PD1) to an input signal of inst_D of power domain 3 (PD3). The level-shifter 312 adjusts the output of the clock gating logic 220 to the input signal of instances A, B, C, and D of the corresponding power domains. Designer can then perform power analysis for different explored netlist and choose one with the least power consumption as the target for implementation.

The following is an example netlist of the CPF file 3 (108) of the top design according to an embodiment of the present invention.

```
set_design top
create_power_domain -name PD1 -default
create_power_domain -name PD2 -instances {inst_B}
    -shutoff_condition {!pm_inst.pse_enable[0]}
```

```
create_power_domain -name PD3 -instances {inst_C
  inst_D }
create_nominal_condition -name high -voltage 1.2
create_nominal_condition -name low -voltage 1.0
create_power_mode -name PM1 -domain_conditions
  {PD1@low PD2@high PD3@high}
create_power_mode -name PM2 -domain_conditions
  {PD1@low PD3@high}
create_isolation_rule -name ir1 -from PD2 -
  isolation_condition {pm_inst.ice_enable[0]} -
  isolation_output high
create_level_shifter_rule -name lr1 -to PD3
end_design
```

Figure 4:
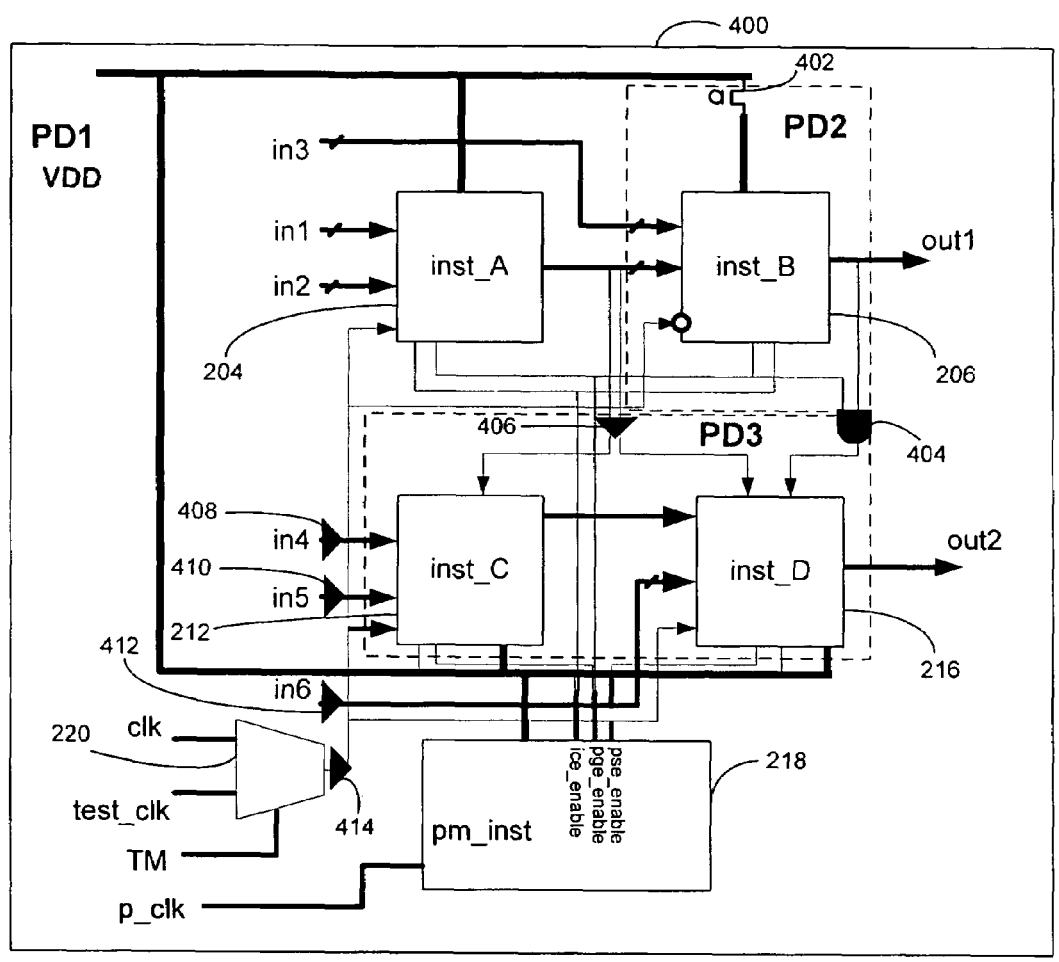
FIG. 4 illustrates a circuit block diagram of the low-power RTL netlist 3 for design exploration according to an embodiment of the present invention.

FIG. 4 illustrates a circuit block diagram of the low-power RTL netlist 3 for design exploration according to an embodiment of the present invention. FIG. 4 represents the low-power RTL netlist 3 that demonstrates variations of low-power design of the RTL netlist 102, with the majority of the circuit instances being substantially similar to the corresponding circuit instances in FIG. 2.

Among the changes in the circuit block diagram for low-power design exploration, the low-power RTL netlist 3 includes a power switch 402 that connects between the power supplies of power domain 1 (PD1) and power domain 2 (PD2). The low-power RTL netlist 3 also includes an isolation cell 404. Specifically, the isolation cell 404 isolates a first output signal from inst_A of power domain 1 (PD1) and a second output signal from inst_B of power domain 2 (PD2) to an input signal of inst_D of power domain 3 (PD3).

Furthermore, the low-power RTL netlist 3 includes level-shifter cells 406, 408, 410, and 414. The level-shifter 406 adjusts the voltage levels of output signals from inst_A of power domain 1 to a first input signal of inst_C and to a second input signal of inst_D of power domain 3. The level-shifters 408 and 410 adjust the voltage levels of input signals in4 and in5 of power domain 1 to the corresponding input signals of inst_C of the power domain 3. The level-shifter 412 adjusts the voltage levels of an input signal (in6) of power domain 1 to an input signal of inst_D of power domain 3. The level-shifter 414 adjusts the output of the clock gating logic 220 to the input signal of instances A, B, C, and D of the corresponding power domains.

Table 3 illustrates a mapping between library cell related low-power commands and their equivalent RTL compiler commands. Note that the RTL compiler annotates the library cells specified through the—cells option with attributes.

TABLE 3

| Library Cell Related Low-Power Commands | Equivalent RTL Compiler Commands |
|---|---|
| define_isolation_cell<br>-cells cell_list [-libraries library_list]<br>[ {-power_switchable LEF_power_pin \|<br>-ground_switchable LEF_ground_pin}<br>-power LEF_power_pin -ground LEF_ground_pin ]<br>[-valid_location { from \| to}]<br>-enable pin | set_attribute is_isolation_cell true libcell<br>set_attribute isolation_cell_enable_pin true libpin |
| define_level_shifter_cell<br>-cells cell_list [-libraries library_list]<br>-input_voltage_range {voltage \| voltage_range}<br>-output_voltage_range {voltage \| voltage_range}<br>[-direction {up\|down\|bidir}]<br>[-output_voltage_input_pin pin]<br>{ -input_power_pin LEF_power_pin<br>[-output_power_pin LEF_power_pin]<br>\| [-input_power_pin LEF_power_pin] -output_power_pin LEF_power_pin }<br>-ground LEF_ground_pin<br>[-valid_location { from \| to}] | set_attribute is_level_shifter true libcell<br>set_attribute level_shifter_enable_pin true libpin |
| define_state_retention_cell<br>-cells cell_list [-libraries library_list]<br>[-clock_pin pin]<br>-restore_function expression<br>[-restore_check expression]<br>[-save_function expression]<br>[-save_check expression]<br>[ {-power_switchable LEF_power_pin \|<br>-ground_switchable LEF_ground_pin}<br>-power LEF_power_pin -ground LEF_ground_pin ] | set_attribute power_gating_cell true libcell<br>set_attribute power_gating_pin_class string libpin<br>set_attribute power_gating_pin_phase {active_low \| active_high \| none} libpin |

Table 4 illustrates a mapping between design implementation low-power commands and their equivalent RTL compiler commands.

TABLE 4

| Design Implementation Low-Power Commands | Equivalent RTL Compiler Commands |
|---|---|
| create_power_domain<br>-name power_domain<br>{ -default [-instances instance_list]<br>\| -instances instance_list<br>[-boundary_ports pin_list]<br>\|-boundary_ports pin_list }<br>[-power_switchable_nets net_list \|<br>-ground_switchable_nets net_list]<br>[ -shutoff_condition expression] | create_power_domain -design design<br>-name domain<br>set_attribute default true<br>power_domain<br>set_attribute power_domain domain<br>{instance\|pin\|port}<br>set_attribute shutoff_signal<br>{pin \| port \| bus} power_domain<br>set_attribute shutoff_signal_polarity<br>{active_high \| active_low}<br>power domain |
| create_isolation_rule<br>-isolation_condition expression<br>{-pins pin_list \|<br>-from power_domain_list \|<br>-to power_domain_list}...<br>[-exclude pin_list]<br>[-location {from \| to}]<br>[-isolation_output<br>{high\|low\|hold}]<br>[-cells cell_list]<br>[-prefix string] | isolation_rule define [-name rule_name]<br>-enable_driver {port\|pin\|subport}<br>[-enable_polarity {active_low \| active_high}]<br>[ -from_power_domain power_domain_list<br>\| -to_power_domain power_domain_list<br>\| -pins pin_list ] ...<br>[-location {from \| to}]<br>[-output_value {low \| high \| hold}<br>isolation_cell insert |
| create_level_shifter_rule<br>{ -from power_domain<br>\| -to power_domain_list<br>\| -from power_domain -to power_domain_list }<br>[-location {from \| to} ]<br>[-cells cell_list] [-prefix string] | define_level_shifter_group<br>-from_library_domain library_domain<br>-to_library_domain library_domain<br>-libcells cell_list<br>level_shifter insert<br>[-from_library_domain library_domain]<br>[-to_library_domain library_domain]<br>[-location {from \| to}] |
| create_state_retention_rule<br>{ -power_domain power_domain \|<br>-instances instance_list }<br>-restore_edge expression [<br>-save_edge expression ]<br>[ -clock_gating_condition expression ]<br>[ -cell_type string ] | state_retention define_map<br>[-hierarchical]<br>[-cell_type string]<br>[-instances instance_list]<br>state_retention define_driver<br>[-replace] [-hierarchical]<br>[-pin_class string]<br>[-driver {pin\|port}]<br>[-driver_polarity {active_low\|active_high}]<br>[-instances instance_list] |

Table 5 illustrates a mapping between design scope low-power commands and their equivalent RTL compiler commands.

TABLE 5

| Design Scope Low-Power Commands | Equivalent RTL Compiler Commands |
|---|---|
| set_instance {hier_instance [-merge_default_domains]\| -top \| -up } | cd /designs/design/*/instances_hier/instance<br>cd /designs/design |
| set_design design | cd /designs/design |

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The fore-

What is claimed is:

1. A method for conducting low-power design explorations, comprising:
   receiving, using a method implemented on a computer system, an input register-transfer-level (RTL) description for a circuit design;
   creating, using a method implemented on a computer system, two or more different respective power requirement files, wherein each different respective power requirement file comprises power commands corresponding to the input RTL description;
   wherein the different power requirement files comprise different combinations of power commands to respectively implement one or more of,
   different schemes of power shutoff,
   different partitions of power domains, and
   different operating condition settings for different power domains;
   comparing power-related characteristics of different RTL implementations of the circuit design, each different RTL implementation determined by the input RTL description and a different respective power requirement file; and
   selecting, based on the comparing, a power requirement file that can be used to implement the circuit design while achieving power-related design goals.

2. The method of claim 1, wherein the input RTL description comprises RTL for a legacy design without low-power functionalities.

3. The method of claim 1, wherein the power commands comprise at least one of:
   library cell commands;
   design implementation commands; and
   design scope commands.

4. The method of claim 1, wherein the comparing of power-related characteristics of the potential implementations of the circuit design comprises:
   mapping the power commands to RTL compiler commands; and
   synthesizing the input RTL description using the RTL compiler commands to generate two or more output RTL descriptions each specifying one or more different power-saving features.

5. The method of claim 1, wherein the comparing of power-related characteristics of potential implementations comprises:
   using the power commands to specify implementation, in multiple output RTLs, of different combinations of one or more of
   power domain isolation,
   input or output signal isolation,
   level shifting between power domains, and
   state retention a power domain while maintaining functionality described in the RTL description.

6. The method of claim 1 further comprising:
   generating two or more output RTL descriptions, based on the functional description and respective power requirement files, each having one or more power reducing features;
   generating a respective gate netlist corresponding to each of the output RTL descriptions and comprising one or more power-saving features; and
   comparing power-related characteristics of the gate netlists for determining which of the power requirements files to use in implementing the input RTL description.

7. A computer readable storage medium to cause a computer system to perform a method comprising:
   receiving a register-transfer-level (RTL) description of a circuit design;
   receiving multiple different power requirement files, wherein each different power requirement file comprises power commands corresponding to the RTL description;
   wherein each different respective power requirement file comprises power commands corresponding to the input RTL description;
   wherein the different power requirement files comprise different combinations of power commands to respectively implement one or more of,
   different schemes of power shutoff,
   different partitions of power domains, and
   different operating condition settings for different power domains;
   generating two or more output RTL descriptions with power saving functionality using the corresponding different power requirement files and the input RTL description; and
   using power-related characteristics of the output RTL descriptions in selecting a power requirements file for producing an implementation of the input RTL description comprising one or more features for reducing power consumption.

8. The computer readable storage medium of claim 7, wherein the input RTL description comprises a legacy design without low-power functionalities.

9. The computer readable storage medium of claim 7, wherein the power commands comprise at least one of:
   library cell commands,
   design implementation commands, and
   design scope commands.

10. The computer readable storage medium of claim 7, wherein the generating of output RTL descriptions comprises:
    mapping the power commands to RTL compiler commands; and
    synthesizing the input RTL description with the RTL compiler commands to generate the output RTL description.

11. The computer readable storage medium of claim 7, wherein the power commands are for implementing one or more of:
    power domain isolation,
    input or output signal isolation,
    level shifting between power domains, and
    state retention within a power domain.

12. The computer readable storage medium of claim 7 wherein the method further comprises:
    generating two or more low-power gate netlists using the corresponding outputRTL descriptions; and
    comparing the low-power gate netlists for determining which power requirement file to use in implementing the input RTL description.

13. A system for conducting low-power design explorations, comprising:
- at least one processing unit for executing computer programs;
- a graphical-user-interface for viewing representations of implementations of a circuit design on a display;
- a memory for storing information of the circuit design;
- logic for receiving a register-transfer-level (RTL) description of the circuit design;
- logic for accessing one or more different power requirement files, wherein each different power requirement file comprises power commands corresponding to the RTL description;
- wherein each different respective power requirement file comprises power commands corresponding to the input RTL description;
- wherein the different power requirement files comprise different combinations of power commands to respectively implement one or more of,
- different schemes of power shutoff,
- different partitions of power domains, and
- different operating condition settings for different power domains;
- logic for generating two or more different low-power RTL descriptions each specifying different combinations of one or more power-saving features based on the corresponding one or more different power requirement files and the RTL description; and
- logic for comparing the different generated low-power RTL descriptions and for selecting a power requirement file to use in creating an implementation of the RTL description with power-saving features specified in the selected power requirement file.

14. The system of claim 13, wherein the RTL description comprises a legacy design without low-power functionalities.

15. The system of claim 13, wherein the power commands comprise at least one of:
- library cell commands;
- design implementation commands; and
- design scope commands.

16. The system of claim 13, wherein the logic for generating comprises:
- logic for mapping the power commands of the different power requirement files to respective RTL compiler commands; and
- logic for synthesizing the RTL description and the respective RTL compiler commands to generate the two or more RTL descriptions having different low-power functionalities.

17. The system of claim 13, wherein the respective power requirement files cause the functional design to be implementable with different combinations of one or more of
- power domain isolation,
- input or output signal isolation,
- level shifting between power domains, and
- state retention within a power domain.

18. The system of claim 13 further comprising:
- logic for generating one or more low-power gate netlists using the corresponding one or more low-power RTL description, wherein the logic for comparing uses the low-power gate netlists.

19. A method for selecting power-saving circuit functions to implement with a circuit design, comprising:
- receiving, using a method implemented on a computer system, an RTL description or a netlist for a circuit design;
- accessing, using a method implemented on a computer system, a plurality of different power requirement files, each specifying one or more power commands, each power command for directing power-related modifications to the circuit design, while preserving functionality represented in the RTL description or netlist;
- wherein the different power requirement files comprise different combinations of power commands to respectively implement one or more of,
- different schemes of power shutoff,
- different partitions of power domains, and
- different operating condition settings for different power domains; and
- selecting from among the plurality of different power requirement files, a power requirements file for use in providing an RTL implementation of the functionality represented in the RTL description or netlist that meets one or more power-related performance criteria.

20. The method of claim 19, further comprising accepting modifications to one or more of the power requirement files responsive to determining that the implementations based on the power requirement files fail to meet the power-related performance criteria.

21. The method of claim 1, wherein the power requirement files respectively include respective power managers that generate control signals to produce different combinations of one or more of (1) different voltages for different power domains of the circuit design, (2) power shutoff to any of the power domains, (3) isolation of any of the power domains, (4) state retention in any of the power domains, and (5) level shifting between any of the power domains.

22. The method of claim 1, wherein the power requirement files collectively divide the circuit design into different power domains, and each of the power requirement files specifies a power manager that generates control signals to produce different combinations of two or more of (1) different voltages for some of the power domains, (2) power shutoff to any of the power domains, (3) isolation of any of the power domains, (4) state retention in any of the power domains, and (5) level shifting between any of the power domains, and selecting comprises determining which of the combinations meets implementation requirements.

* * * * *